July 4, 1967  B. A. PALM  3,329,079
APPARATUS FOR CONTINUOUS AND STERILE FILLING OF
LIQUIDS INTO CONTAINERS
Filed Jan. 27, 1966
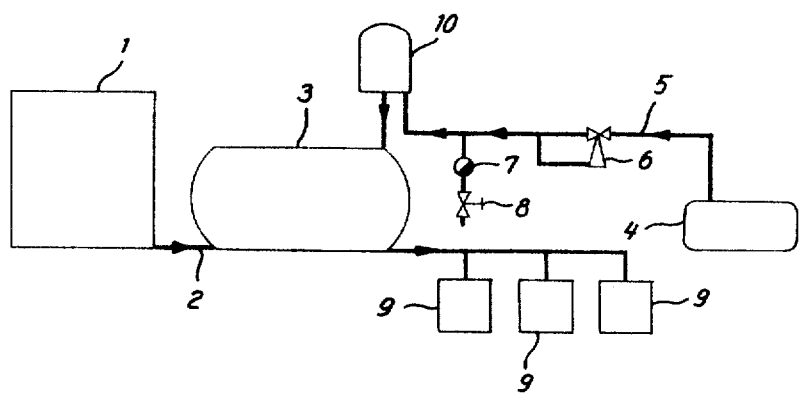
Inventor
Bengt Arne Palm
by
Davis, Hoxie, Faithfull + H United States Patent Office 3,329,079
Patented July 4, 1967

3,329,079
APPARATUS FOR CONTINUOUS AND STERILE
FILLING OF LIQUIDS INTO CONTAINERS
Bengt Arne Palm, Genarp, Sweden, assignor to Alfa-
Laval AB, Tumba, Sweden, a Swedish corporation
Filed Jan. 27, 1966, Ser. No. 523,416
Claims priority, application Sweden, Feb. 4, 1965,
1,416/65
4 Claims. (Cl. 99—252)

The present invention relates to an improved apparatus for continuous and sterile filling of a liquid, such as milk, beer or fruit juice, from a sterilizer into small vessels by way of a filling machine.

When filling sterilized milk, for example, the sterilized milk is fed through a closed duct to an aseptic filling machine without admission of atmospheric air. Since the filling machine cannot always discharge the milk at the same rate that it is delivered from the sterilizer, the apparatus of the present invention includes an equalization container inserted between the sterilizer and the filling machine. This container maintains a volume of milk which varies depending upon the demands of the filling machine in relation to the rate of milk delivery from the sterilizer.

In order to make liquid level changes in the equalization container possible without disturbances of the filling operation and without infection of the milk, the equalization container is provided with a filter to admit air or other gas into the container, when the liquid level in the latter sinks. The filter serves to sterilize the air or other gas passing through it; and it can be of any conventional type, such as a glass wool filter having fine pores. In the simplest case, the interior of the equalization container has a direct connection to the surrounding atmosphere via the filter, the liquid level changes in the container causing air to flow out or in through the filter. In such an embodiment, it is necessary to use a pump to feed the milk to the filling machine, if no flow to this machine is provided by means of static pressure. The use of a pump, however, is accompanied by the risk of infection through the packings.

Consequently, according to a preferred embodiment of the invention, the milk is fed to the filling machine from the equalization container by connecting the latter to a source of supply of gas at a constant superatmospheric pressure, such an air compressor. When the liquid level in the equalization container rises, the excess gas or air can be discharged through a valve connected directly to the interior of the container, so that the pressure in the interior of the container is kept constant. In view of the risk of infection, however, such a valve must be rather complicated. On the other hand, by providing a leakage member in the duct between the gas supply source (the air compressor) and the filter, the excess gas can be discharged from the interior of the container through the filter, which thus forms the necessary barrier against infection. This enables the use of an inexpensive leakage member of a standard form, for example, a thermodynamic steam trap.

The invention is explained more in detail below, reference being made to the accompanying drawing, in which the single illustration is a schematic view of a system embodying one form of the new apparatus.

In the drawing, reference numeral 1 designates a sterilizer, which is assumed to be of a type adapted to sterilize milk. The milk leaves the sterilizer 1 under pressure through a pipeline 2 and enters an equalization container 3. The interior of container 3 is kept under constant pressure by an air compressor 4 and a constant pressure valve 6 which is inserted in a pipeline 5 between the compressor and the equalization container. The constant pressure valve 6 co-operates with a thermodynamic steam trap 7 inserted in the same pipeline and having in its outlet an adjustable throttling valve 8. This steam trap 7 allows a constant leakage of compressed air from pipeline 5. By means of the pressure in the container 3, three filling machines 9 are fed with sterilized milk from the container. The compressed air from the compressor 4 passes through a filter 10 of glass wool forming fine pores. Filter 10 is inserted in the pipeline 5 between steam trap 7 and container 3.

In order to sterilize the system prior to normal operation, steam at a pressure of 2.5 to 3.0 kg./cm.$^2$ is supplied to the sterilizer 1, from which it passes through pipe 2 to container 3. The air in the latter is displaced by the steam and discharges through the steam trap 7, 8. After the container 3 has been completely filled with steam, the steam trap closes, completing the steam-sterilizing operation. The compressor 4, which provides a pressure of 7 kg./cm.$^2$, is in continuous operation. However, since the valve 6 is adjusted to keep a constant pressure of 0.5 kg./cm.$^2$ (i.e., a lower pressure than that of the sterilizing steam), no air is consumed, but the valve 6 functions as a non-return valve.

In order to place the system in normal operation, the steam supply to sterilizer 1 is interrupted and the steam content of the container 3 is condensed by means of a cooling jacket (not shown). When the steam pressure falls below 0.5 kg./cm.$^2$, air is automatically supplied by valve 6 from the compressor 4. This air is sterile when it enters container 3, due to its passage through the filter 10. Thereafter, milk is fed into the container 3 from the sterilizer 1. At the same time, a corresponding quantity by volume of air discharges through the trap 7, 8. The liquid level in the container 3 varies according to the rate of consumption of milk by the filling machines in relation to the rate of supply of milk from the sterilizer 1. When the liquid level falls, air is supplied to the container 3 from the compressor 4; and when the liquid level rises, air discharges from the container through the trap 7, 8. Thus the air pressure in the container is kept substantially constant at 0.5 kg./cm.$^2$.

I claim:
1. In combination with a sterilizer and a machine for continuously filling small vessels with liquid from the sterilizer, apparatus comprising an equalization container communicating with the sterilizer and filling machine and through which sterilized liquid is fed to said machine, and means including sterilizing unit for admitting a gaseous medium into the container in response to lowering of the liquid level in said container, said sterilizing unit being operable to sterilize said medium.

2. Apparatus as defined in claim 1, comprising also a source of supply of a gaseous medium at a substantially constant superatmospheric pressure, said means also including a pipeline connecting said source through the sterilizing unit to said container.

3. Apparatus as defined in claim 2, comprising also a leakage member connected to the pipeline between said sterilizing unit and said source and operable to discharge gas from the container in response to rising of the liquid level in the container.

4. Apparatus as defined in claim 1, in which said sterilizing unit is a filter.

(References on following page)

References Cited

UNITED STATES PATENTS

| | | | |
|---|---|---|---|
| 2,239,397 | 4/1941 | North et al. | 99—212 |
| 2,411,681 | 11/1954 | Egli | 99—252 X |
| 2,887,391 | 5/1959 | Jacobsson et al. | 99—211 |
| 2,897,082 | 7/1959 | Kaiser | 99—252 X |

WALTER A. SCHEEL, *Primary Examiner.*

R. W. JENKINS, *Assistant Examiner.*